Dec. 28, 1926.  
B. J. LINDGREN  
1,612,519  
SIDE SEAMING MACHINE  
Filed June 10, 1925    8 Sheets-Sheet 2

Dec. 28, 1926.
B. J. LINDGREN
1,612,519
SIDE SEAMING MACHINE
Filed June 10, 1925  8 Sheets-Sheet 3
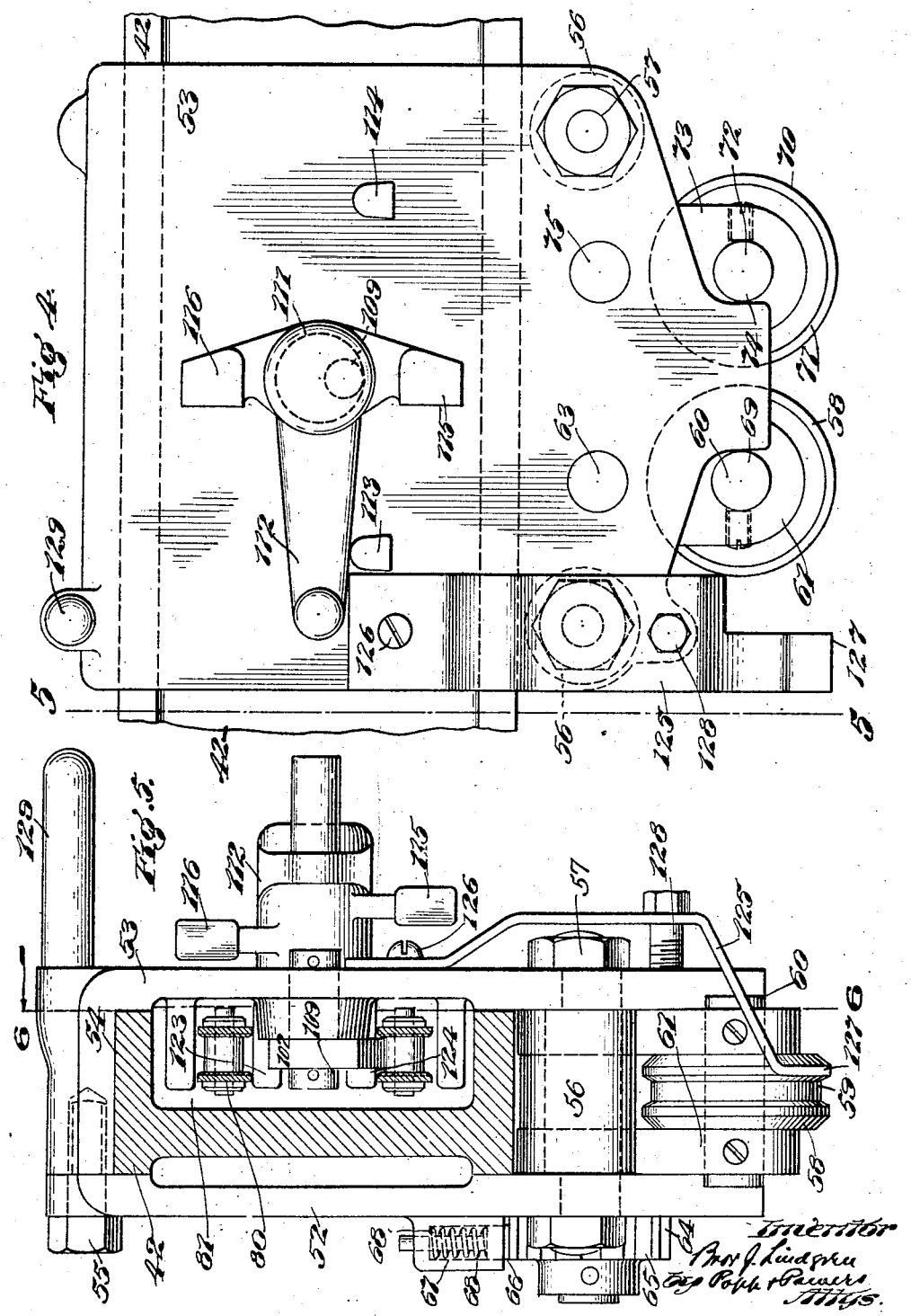

Dec. 28, 1926.
B. J. LINDGREN
1,612,519
SIDE SEAMING MACHINE
Filed June 10, 1925    8 Sheets-Sheet 4
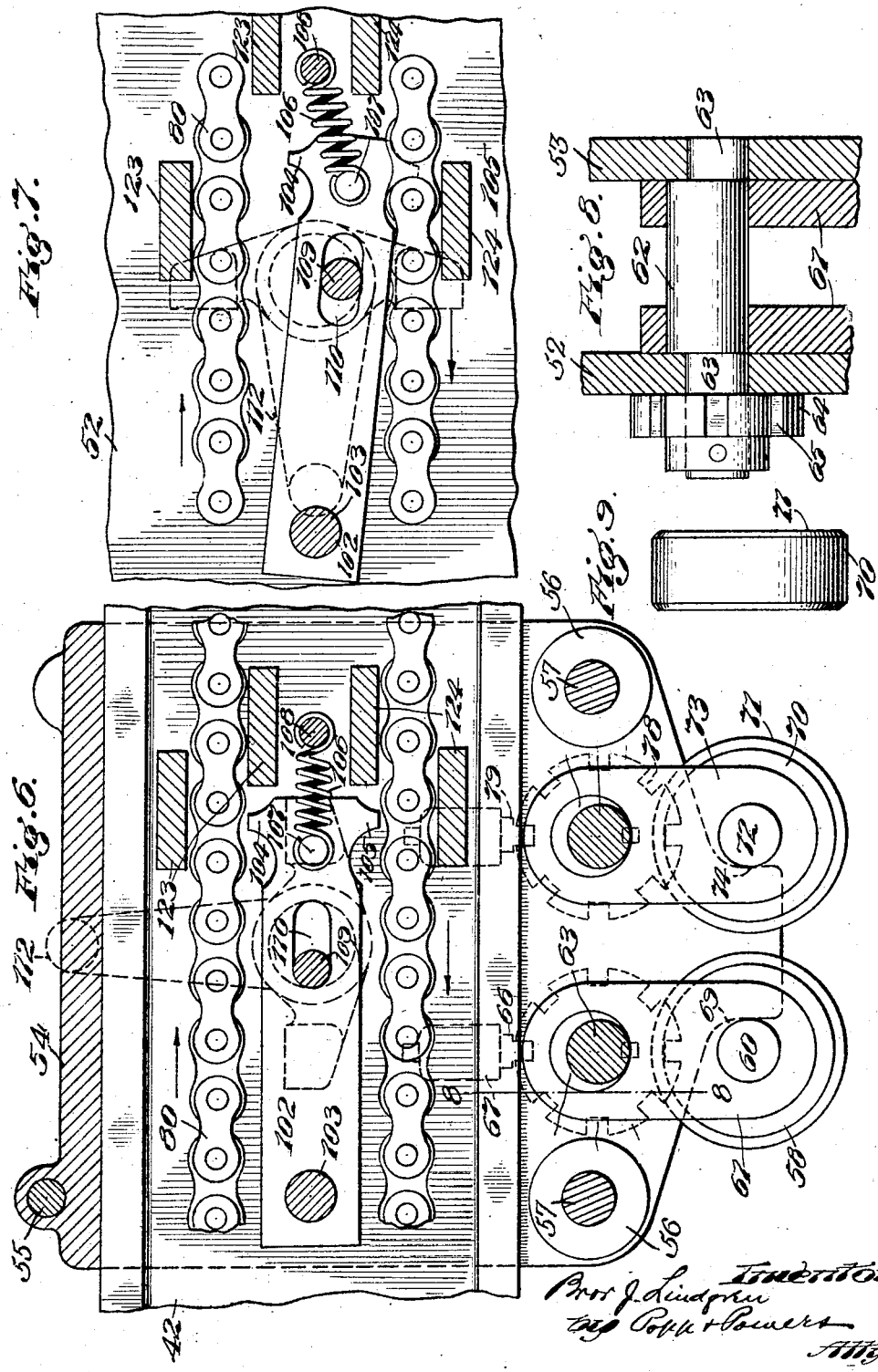

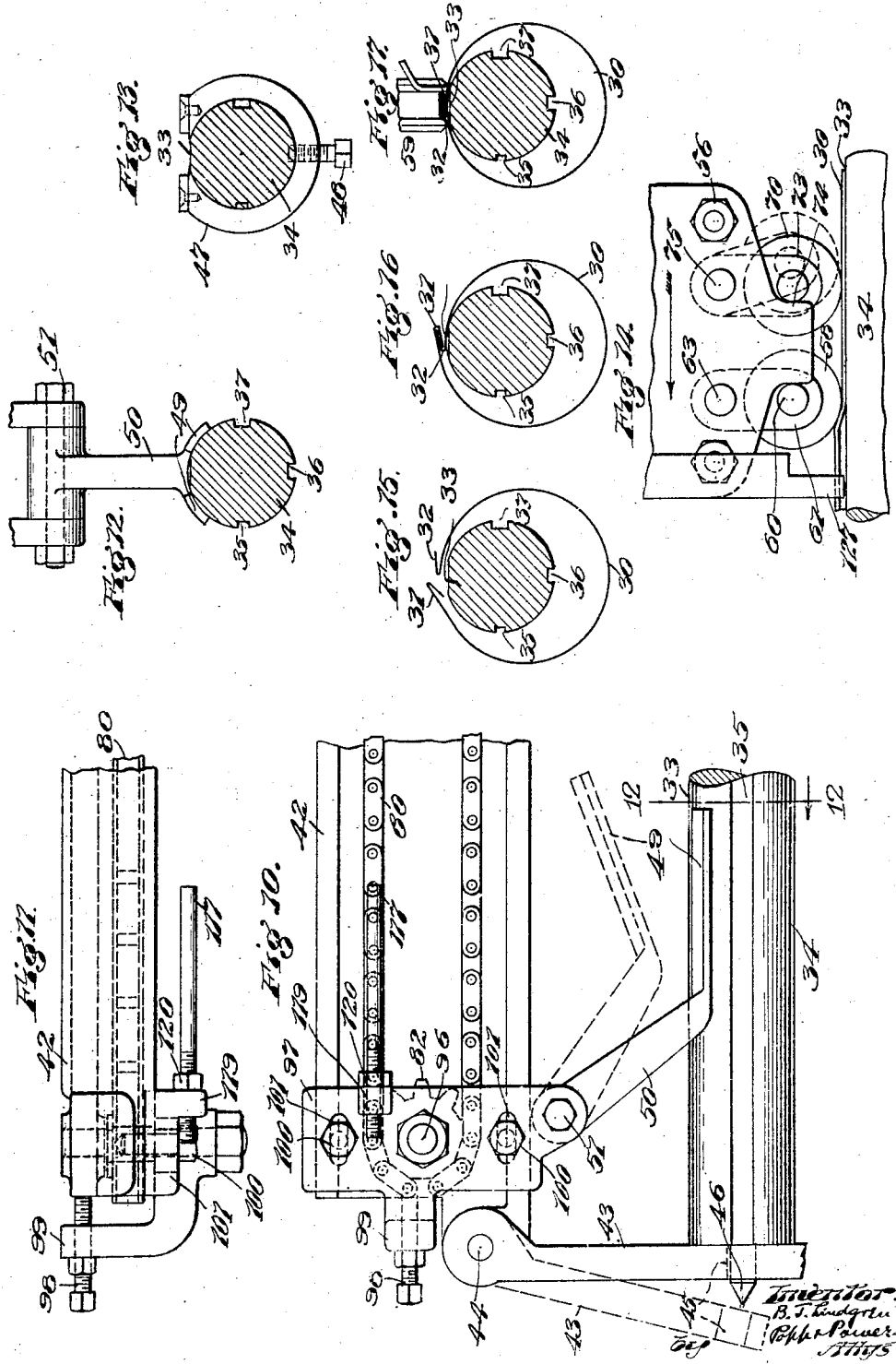

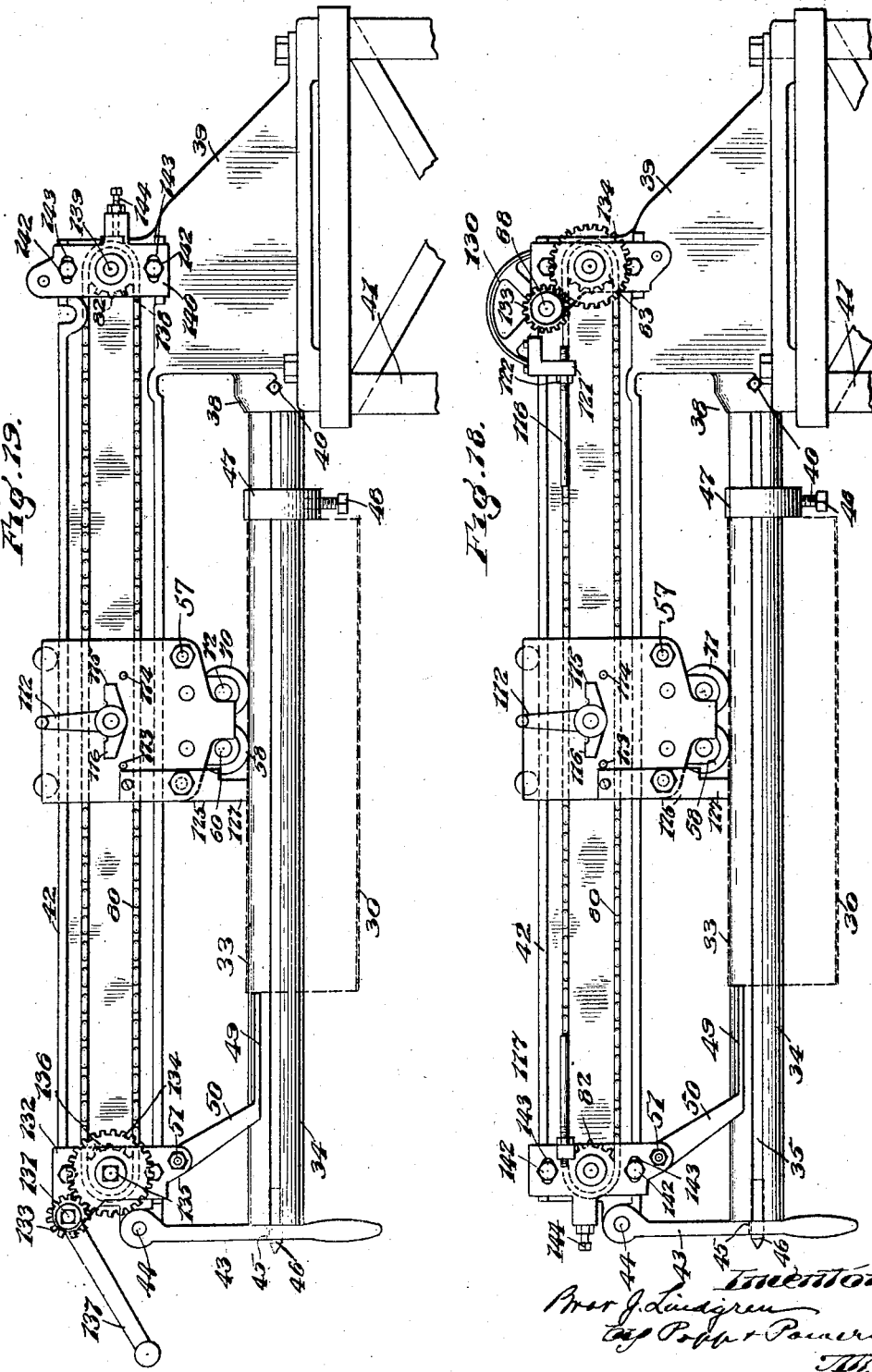

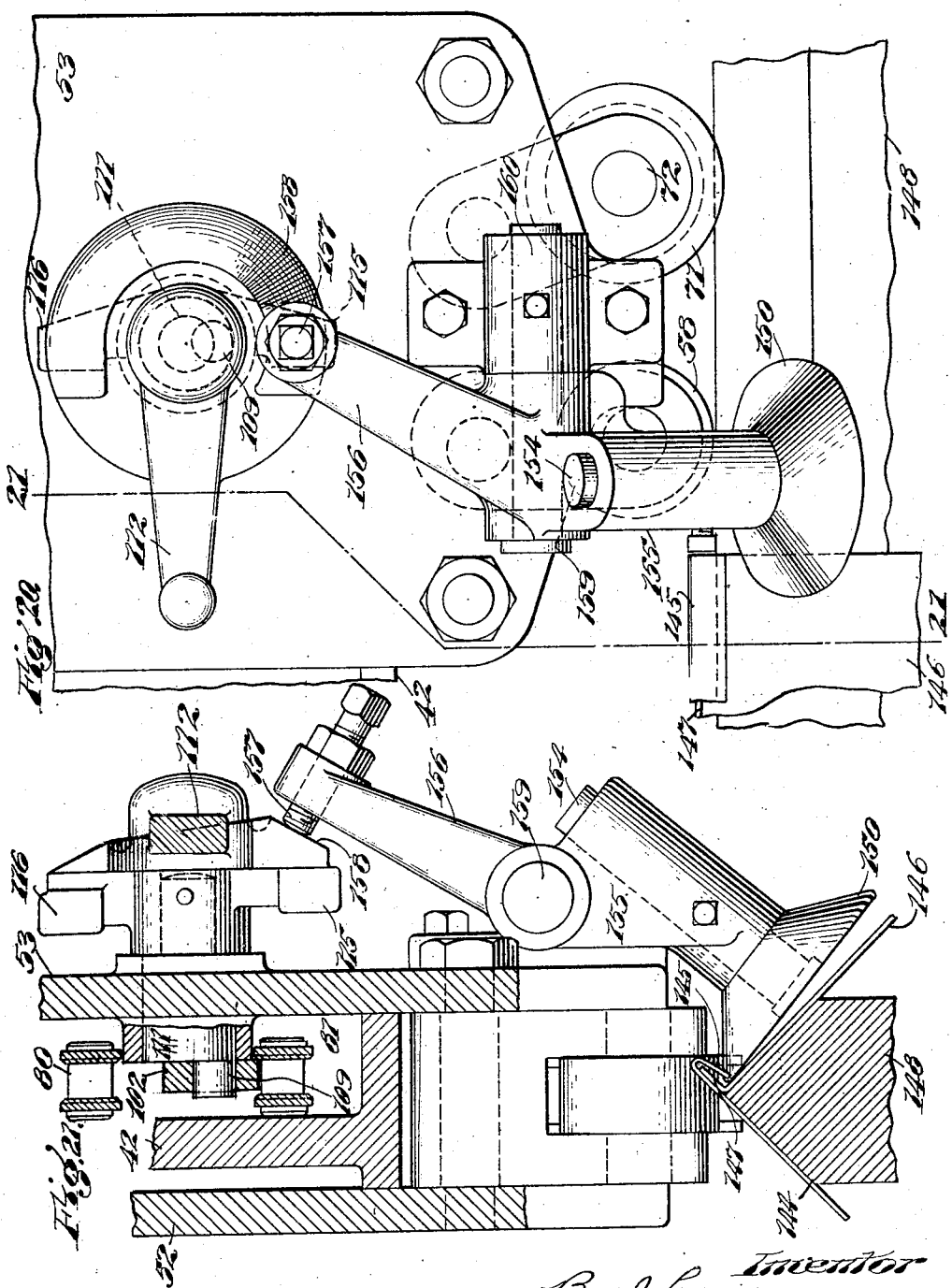

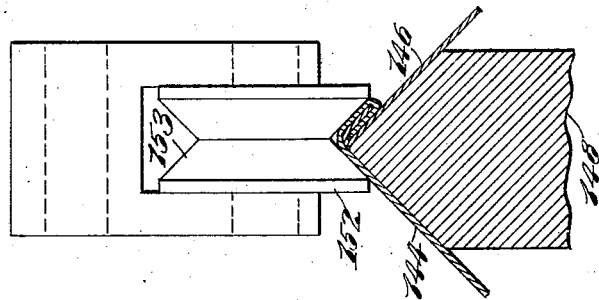
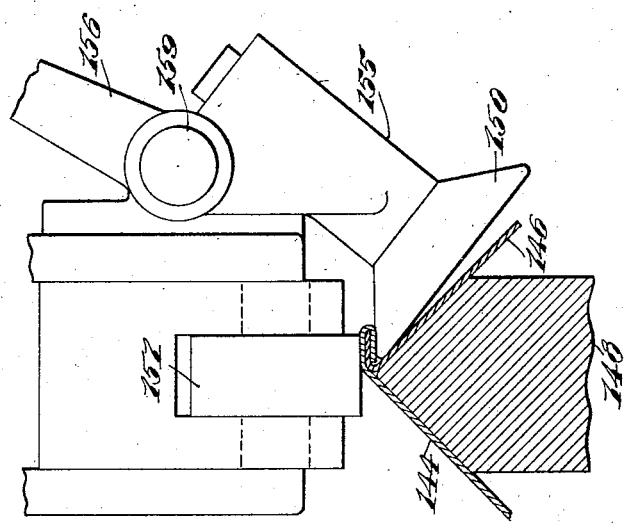
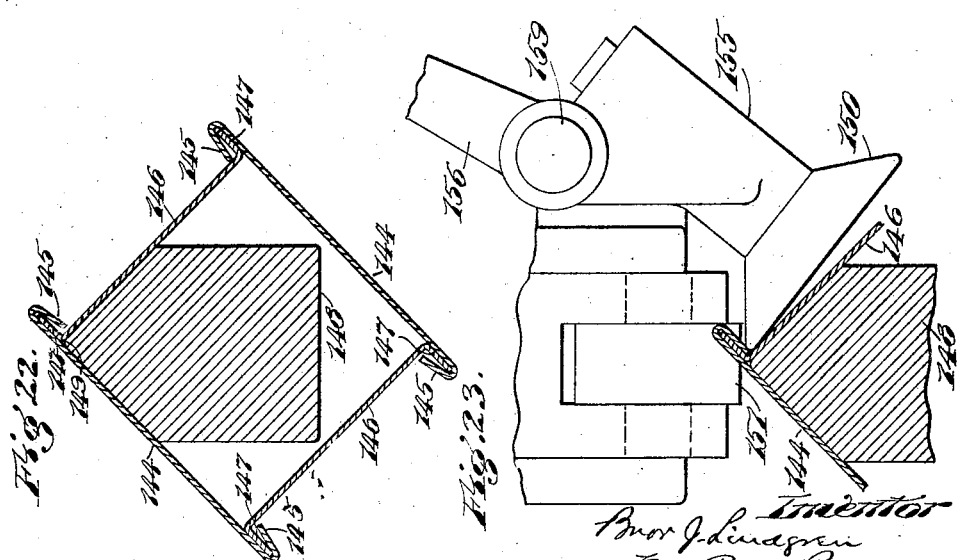

Patented Dec. 28, 1926.

1,612,519

UNITED STATES PATENT OFFICE.

BROR J. LINDGREN, OF BUFFALO, NEW YORK, ASSIGNOR TO NIAGARA MACHINE & TOOL WORKS, OF BUFFALO, NEW YORK, A CORPORATION OF NEW YORK.

SIDE-SEAMING MACHINE.

Application filed June 10, 1925. Serial No. 36,290.

This invention relates to a machine for closing the side seams of a tubular member or body which is made from a flat sheet of metal, such machines being generally known in the trade as side seaming or grooving machines.

One of the objects of this invention is to provide a machine of this character which can be operated either manually or by power. Another object of this invention is to so design the machine that when driven by power the operating tools can be coupled with the driving mechanism so that this tool will be propelled by power and when the tool reaches the end of its stroke the carriage supporting the same will be automatically disconnected from the driving mechanism. Another object of this invention is to permit of moving the carriage which supports the seaming tools either forwardly or backwardly and to automatically disconnect the same from the driving mechanism at either end of its stroke.

Further objects of this invention are to so organize the machine that the same is capable of producing a seam or joint at the corner of a sheet metal box or container which is rectangular in cross section and to accomplish this purpose easily, expeditiously and economically. Still further objects of this invention are to improve this machine in various details of construction as will presently appear.

In the accompanying drawings:—

Figure 4 is a fragmentary side elevation, on an enlarged scale of the tool supporting carriage and associated parts but showing the trip mechanism for coupling the carriage with the power in a different position from that shown in Fig. 1.

Figure 5 is a vertical cross section taken on line 5—5, Fig. 4.

Figure 6 is a vertical longitudinal section of the tool supporting carriage and the adjacent part of the supporting arm on which it is guided and also the adjacent part of the driving mechanism, this section being taken on line 6—6, Fig. 5.

Figure 7 is a fragmentary view similar to Fig. 6, but showing the mechanism which couples the tool supporting carriage with the driving mechanism in an operative condition.

Figure 8 is a fragmentary vertical transverse section taken on line 8—8, Fig. 6.

Figure 9 is a front elevation of the seam flattening or finishing roll.

Figure 10 is a fragmentary side elevation, on an enlarged scale of the front end of the machine.

Figure 11 is a top plan view of the same.

Figure 12 is a vertical transverse section taken on line 12—12, Fig. 10, looking forwardly.

Figure 13 is a vertical transverse section, on an enlarged scale taken on line 13—13, Fig. 1, looking backwardly.

Figure 14 is a fragmentary side elevation of the machine showing the bending roll in operation on the tubular blank for bending the interlocked hook-shaped flanges of the tubular blank so that they remain in engagement with each other preparatory to completing the seaming operation thereon.

Figures 15, 16 and 17 are vertical cross sections of the horn which supports the tubular blank and showing the positions which this blank assumes during different stages of the operation of forming a longitudinal seam joint between the edges thereof.

Figure 18 is a side elevation showing the machine organized for driving the same by means of belt power instead of an electric motor.

Figure 19 is a similar view showing the manner of operating the same by hand power instead of motor power.

Figure 20 is a fragmentary side elevation of the machine showing the same organized for side seaming or grooving the corners of sheet metal containers which are of rectangular form in cross section.

Figure 21 is a fragmentary vertical section taken on line 21—21, Fig. 20.

Figures 22, 23, 24 and 25 are cross sections illustrating the different stages in the operation of seaming a container or tubular body which is of rectangular form in cross section.

Similar characters of reference indicate the same points throughout the drawings.

The machine shown in Figs. 1–19 is more particularly designed for side seaming a sheet metal blank which has been bent so as to form a tubular body 30 and provided at one of its longitudinal edges with an inner hook or reversely bent flange 31 and on its opposite longitudinal edge with an outer hook or reversely bent flange 32, as shown in Fig. 15. Preparatory to seaming the sides or longitudinal edges of this tubular body together, the hook-shaped flanges 31, 32 thereof are first loosely interlocked, as shown in Fig. 16. Thereafter these interlocked hooks are prevented from becoming disengaged from each other by bending the body of the metal adjacent to one of these hooks along the adjacent hook. This can be accomplished so that the rib or bead formed by the interlocking hooks is arranged on the outer side of the body of the finished tube, as shown in Fig. 17 or these parts may be bent so that this rib or body is arranged on the inner side of the tubular body, both of these methods being common and well known in the art and either form of finished tube being selected in accordance with the particular use to which the same is to be put.

After the hooks of the tubular blank have been thus interlocked and bent relatively to each other so they can not separate, the bead or the rib formed thereby is firmly pressed together so as to form a tight joint therebetween and complete the connection between the longitudinal edges of the sheet metal tube.

Figure 1:
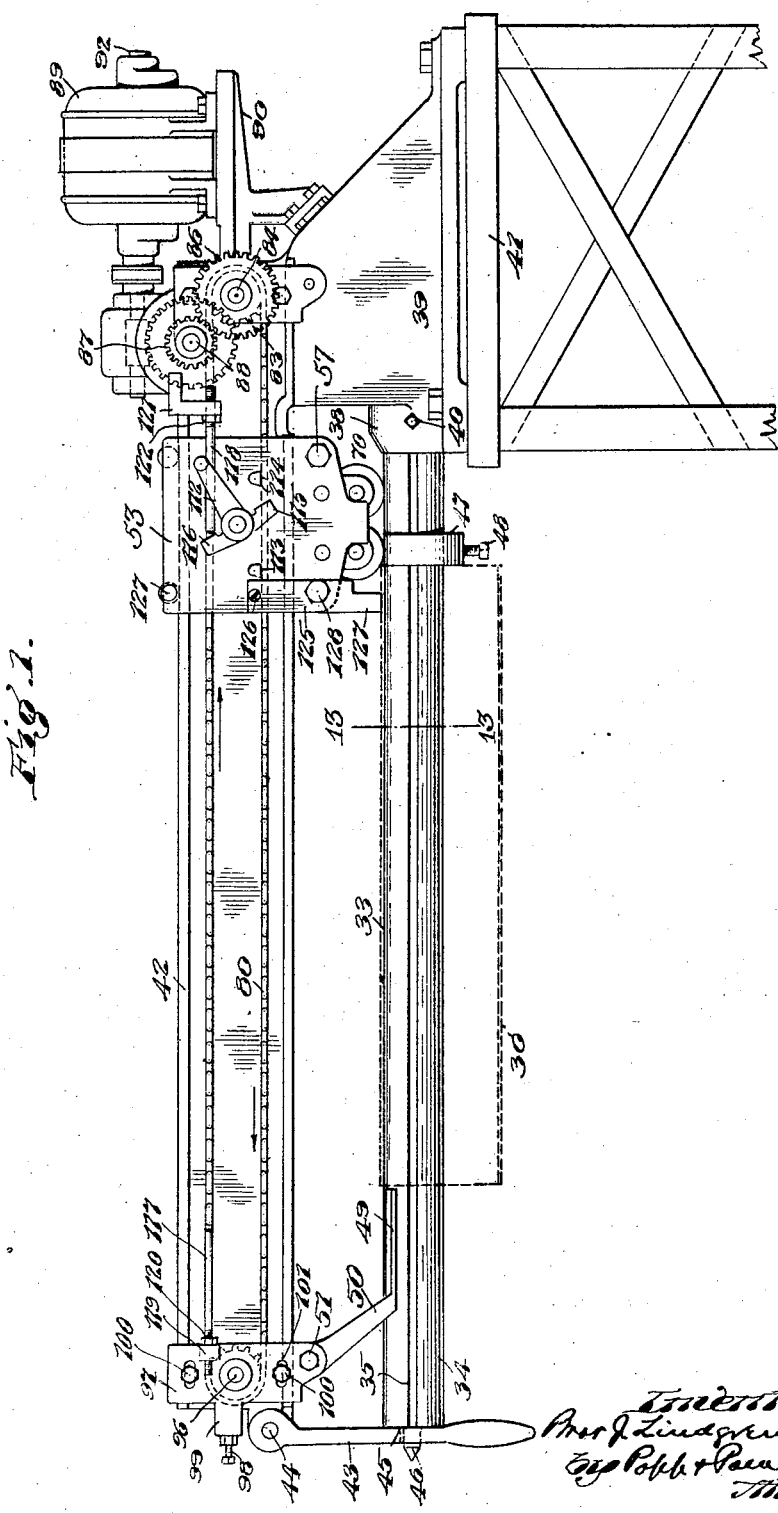
Figure 1 is a side elevation of one form of my improved seaming machine showing the same organized for side seaming a cylindrical tubular body and showing the same driven by an electric motor.

When the rib or seam of the interlocked hooks is intended to be arranged on the outer side of the finished tube the operation of interlocking, bending or grooving, flattening or finishing the hooks on the blank is effected on the flattened upper side 33 of a supporting horn or anvil 34 which is usually arranged horizontally or lengthwise of the machine. In Figs. 12, 13, 15, 16 and 17 the horn is so arranged for the purpose just mentioned, but if it is desired to have the rib or seam at the joint between the longitudinal edges of the body arranged on the inner side thereof then the interlocked hooks of the body are bent and pressed together within a longitudinal groove on the periphery of the horn. In order to permit seams of different widths to be formed on the joints of the tube a plurality of such grooves 35, 36, 37 are provided on different quarters of its periphery thereby enabling the operator to select the particular surfaces of the horn best suited for the character of the seam which he desires to produce and bring these surfaces of the horn to the uppermost or working position by rotating the horn on a support, this being a practise well known in the art. For this purpose the rear end of the horn is mounted in a socket 38 on the lower part of a base 39 so as to be capable of rotary adjustment therein, a clamping screw 40 being provided for holding the horn in place in its adjusted position. This base may be mounted on any suitable support such, for example, as a frame or bench, or standard, 41 as shown in Fig. 1.

Projecting forwardly from the upper end of the base 39 and arranged lengthwise and horizontally over the horn is a longitudinal arm or beam 42 which serves as a support and guide for various working parts of the machine, as will be described later on. The rear ends of the horn and supporting arm 42 are rigidly connected through the medium of the base 39 but the front ends of the same are detachably connected so as to permit opening the space between the horn and supporting arm to permit of removing the seamed or finished tubular body preparatory to replacing the same by a new unseamed blank. The means for thus detachably connecting the supporting arm and horn, which are shown in the drawings, comprises a latch 43 pivoted at its upper end by means of a transverse pin 44 to the front end of the supporting arm 42 while its lower end is provided with an opening 45 adapted to engage with a coupling pin 46 on the front end of the horn 34.

During the operation of seaming a tubular blank the seam is confined in its proper position on the horn by engaging the rear end of this blank with a gage collar 47 which is adjustably secured to the horn by means of a screw 48, while the front end of this blank is engaged with the rear ends of the tines 49 of the fork-shaped gage 50. The latter is pivotally supported at its upper front end by means of a screw or bolt 51 to an adjacent part of the main frame of the machine so that this gage can be either swung downwardly into operative relation on the upper side of the horn, as shown by full lines in Figs. 1, 10 and 12, or the same can be raised into an inoperative position, as shown by dotted lines in Fig. 10, so as to clear the space above the horn and permit of withdrawing the finished seamed tube therefrom.

Mounted on the supporting arm so as to be capable of horizontal longitudinal reciprocation thereon is a carriage which supports the tools which operate upon the sheet metal tubular blank for forming the seam on the longitudinal edges thereof. This carriage may be variously constructed but in the preferred form of the same shown in Figs. 1, 4, 5 and 6, the same comprises two side plates 52, 53 arranged lengthwise on opposite sides of the guide arm or beam 42 and projecting through the lower parts below the same, a horizontal flange 54 resting on top of the supporting arm 42 and preferably formed integrally with one of the side plates of the carriage and detachably connected with the other by means of bolts 55 and rollers 56 arranged between the lower parts of the side plates 52 and 53 and pivotally mounted thereon by means of tie bolts 57 and having rolling engagement with the under side of the supporting arm 42, as shown in Figs. 4 and 5. On the lower front part of the carriage is mounted a preliminary bending or grooving roll 58 which is adapted to engage with the interlocked longitudinal hooks of the tube blank and effect a bend on one longitudinal edge portion of the blank relatively to the other for the purpose of preventing separation of the hooks, for which purpose this roll is provided with a peripheral groove 59 which receives the bead or rib formed on the exterior of the tube, as shown in Figs. 5 and 17. This bending or grooving roll is mounted on a pivot pin or axle 60, the opposite ends of which are mounted on the lower ends of two links 61 arranged between the lower parts of the carriage side plates 52, 53. The upper ends of these links are mounted on the central eccentric portion 62 of an adjusting pin the trunnions 63 of which are journaled in suitable bearings on the adjacent parts of the side plates 52, 53 so that by turning this pin its eccentric 62 may be shifted circumferentially and thereby raise or lower the grooving or bending roll 58 relative to the horn and thereby adapting this roll to the thickness of the metal which is being operated upon as well as permitting of readily adjusting the machine when setting the same up and also taking up wear. This eccentric adjusting pin is held against rotation after the desired adjusting has been effected by means of a locking wheel or adjusting wheel 64 secured to one end of the eccentric pin and provided with an annular row of notches or recesses 65, a locking dog or pawl 66 adapted to engage with one or another of the notches 65 and slidable vertically in a socket 67 mounted on the adjacent part of the carriage side plate 52, and a spring 68 arranged in the socket 67 and bearing at one end against the dog 66 and at its opposite end against the bottom of the socket 67 and operating to hold this dog yieldingly in engagement with one or another of the notches 65.

The grooving or bending roll 58 engages with the interlocked hooks of the tubular blank during the forward movement of the carriage during which time the rearward movement of the link 61 relatively to the carriage is arrested by engagement of the opposite ends of the axle 60 with shoulders 69 on the adjacent lower front parts of the side plates 52, 53, as shown in Figs. 6 to 14, thereby holding this grooving roll rigidly in position so that it operates effectively upon the interlocked hooks of the tubular blank for seaming the same. Upon, however, subsequently moving the carriage backwardly after the forward stroke of the same has been completed the links 61 and grooving roll 58 are free to swing forwardly so that this roll does not exert any effect upon the seam at this time.

During the backward stroke of the carriage the interlocked hooks which have been previously held against separation by the rolling or bending operation thereon are now flattened or pressed tightly against each other so as to complete the seam therebetween by engagement therewith of a flattening or finishing roller 70 which is mounted on the lower rear part of the carriage. The periphery 71 of this flattening or finishing roller is of cylindrical form, as shown in Fig. 9, so that when the same engages with the previously interlocked hooks of the tubular blank under pressure these hooks will be firmly pressed together for completing the seam. This flattening roller is mounted on an axle or pin 72, the opposite ends of which are carried by the lower ends of two links 73 which are arranged between the lower rear parts of the side plates 52, 53 of the carriage while their upper ends are pivotally mounted upon this carriage so that the links can swing rearwardly on their forward movement together with the roll mounted thereon which is limited by engagement of the opposite ends of the axle 72 with rearwardly facing shoulders 74 formed on the adjacent lower parts of the carriage side plates, as shown in Figs. 4 and 6. Due to this construction this roller is free to swing rearwardly relatively to the carriage and simply drag idly over the top of the tubular blank without effecting the seam thereof during the forward movement of the carriage, but during the backward movement of the latter the axle 72 by engagement with the shoulder 74 operates as a rigid stop which holds the links 73 against swinging forwardly relatively to the carriage and thereby compels the finishing or flattening roll 70 to exert a pressure against the interlocked flanges of the same for flattening or tightly pressing the same together and completing the seam.

Vertical adjustment of the flattening or finishing roll 70 for adapting the same to different thicknesses of metal and other conditions is effected by means which are similar to those employed in connection with the grooving or bending roll 58 and which consists generally of an adjusting pin 75 journaled at its opposite ends in the side plates 52, 53 of the carriage and provided on its central part with an eccentric 76 upon which the links 73 turn and an adjusting wheel 77 secured to one end of the pin 75 and provided with an annular row of notches 78 in its periphery, one or the other of which is adapted to be engaged by a spring pressed dog or locking pawl 79 mounted on the adjacent part of the side plate 52 in the manner heretofore described with reference to the dog or pawl 66 of the grooving or bending roll 58.

The mechanism for moving the tool supporting carriage forwardly and backwardly relatively to the work supporting horn of the guide arm may be variously constructed but in the preferred form shown in the drawings the same is organized as follows:—

Figure 2:
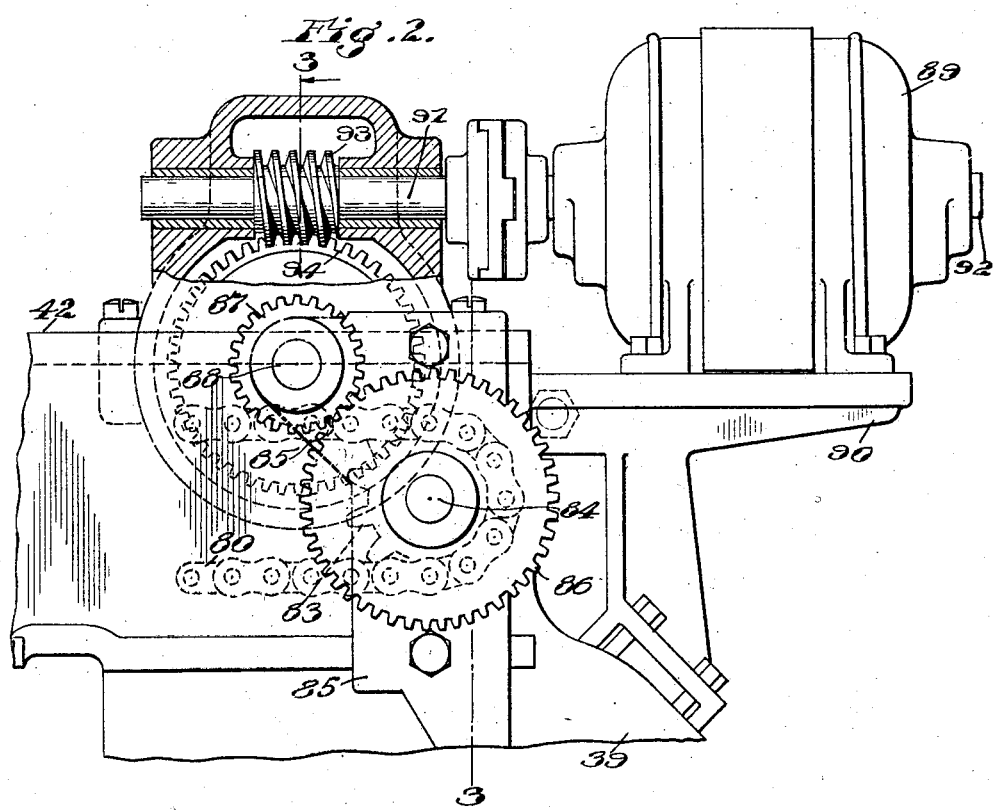
Figure 2 is a fragmentary sectional side elevation, on an enlarged scale showing more particularly the driving mechanism of the machine illustrated in Fig. 1.
Figure 3:
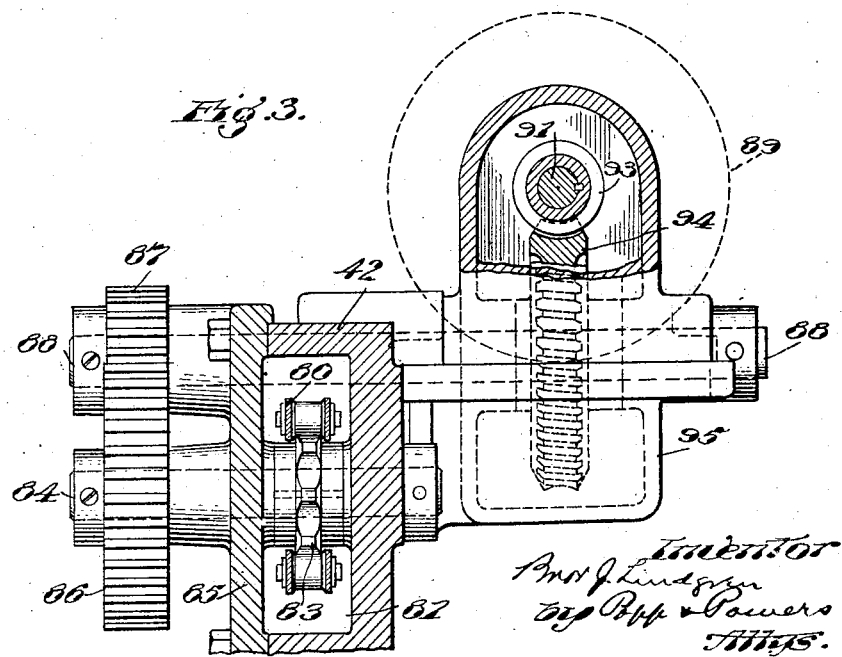
Figure 3 is a vertical transverse section taken on line 3—3, Fig. 2.

The numeral 80 represents an endless belt preferably of the chain type which is arranged within a longitudinal channel 81 on the one side of the supporting arm or beam 42 and has upper and lower stretches which move horizontally and lengthwise while its front and rear turns pass around sprocket wheels 82, 83 arranged at the front and rear ends of the supporting arm. The rear sprocket wheel 83 in the construction shown in Figs. 1, 2, 3 and 18 serves as a driving sprocket wheel while the front sprocket wheel 82 in this instance merely serves as a support for this belt. The driving sprocket wheel 83 in the example shown in Figs. 1, 2 and 3 is mounted on a transverse shaft 84 which is journaled in a suitable bearing formed on the rear part of the arm 42 and a bearing formed in a bracket 85 secured to the rear part of the arm 42 so as to extend across the channel 81 therein. On one end of the shaft 84 and adjacent to the outer side of the bracket 85 the same is provided with a gear wheel 86 which meshes with a gear pinion 87 on a driving shaft 88 journaled in suitable bearings formed in the upper part of the bracket 85 and the arm 42. Motion is imparted to the driving shaft 88 in this instance by means of a prime mover consisting of an electric motor 89 mounted on a bracket 90 on the rear end of the supporting arm 42 of the adjacent part of the base 39, a longitudinal main shaft 91 connected with the motor shaft 92 and provided with a worm 93 which meshes with a worm wheel 94 on the driving shaft 88, and a bracket 95 mounted on that side of the supporting arm 42 opposite to the gears 86 and 87 and provided with suitable bearings for the driving shaft 88 and the main shaft 91. By this gearing the high speed of the electric motor 89 is reduced so that the chain belt 80 is moved in the direction of the arrows associated therewith in Figs. 6 and 7 at a comparatively low speed but with great power.

The front sprocket wheel 82 is preferably so mounted that the same is capable of being mounted lengthwise of the arm 42 for the purpose of producing the proper tension on the sprocket chain belt 80 and taking out any slack or wear in the latter. For this purpose the sprocket wheel 82 is mounted on an arbor or pivot pin 96 which is carried on the central part of a cross head 97 capable of longitudinal adjustment on the supporting arm or beam 42. This adjustment is preferably effected by means of an adjusting screw 98 working in a laterally projecting lug 99 on the front part of the cross head 97 and bearing against the front end of the supporting arm 42 and clamping screws 100 connecting the upper and lower parts of the cross head 97 with the corresponding parts of the arm 42 and passing through longitudinal slots 101 in the upper and lower parts of the cross head 97, as shown in Figs. 1, 10 and 11. Upon loosening the adjusting screws 98 in one direction or the other the chain belt 80 may be tightened or slackened as desired.

Means are provided for coupling and uncoupling the tool carriage with either of the upper or lower oppositely moving stretches of the chain belt for the purpose of causing the carriage to move either forwardly or backwardly and operatively engaging either the bending or grooving roll or the flattening or finishing roll with the seam of the tubular blank which is supported on the horn. The means for this purpose which are shown in the drawings comprise a vertically swinging coupling dog or pawl 102 which is arranged lengthwise within the channel of the supporting arm or beam 42 and pivotally mounted at one end on the adjacent side plate of the carriage by means of a horizontal transverse pivot pin 103, while the opposite end of this coupling dog is provided with an upwardly projecting upper hook 104 and a downwardly projecting lower hook 105. When this dog is in its central position in which both of its hooks 104, 105 are out of engagement with both stretches of the propelling chain 80, as shown in Fig. 6, then the carriage will remain at rest, and be uninfluenced by the movement of the propelling chain. Upon depressing the dog 102 so that its lower hook 105 engages with the lower stretch of the propelling belt then the carriage will be coupled with this stretch of the belt and become compelled to move forwardly therewith so that its bending or grooving roll 58 will be operatively engaged with the co-operating hooks of the sheet metal tubular blank and exert a bending action thereon as previously described. Upon raising the coupling dog or pawl 102 from its central or neutral position so that its upper hook 104 engages with the upper oppositely moving stretch of the propelling belt then the carriage will be coupled with the respective stretch of this belt and caused to move backwardly for the purpose of moving the flattening or finishing roll 70 over the interlocked hooks of the tubular blank and complete the seaming operation thereon. When free this latch is yieldingly held in its central, neutral or inoperative position by means of a spring 106 one end of which is connected with a pin 107 on the free end of the dog while its opposite end is connected with a pin 108 on the adjacent side plate of the carriage. The movement of the coupling dog 102 from its central or neutral position into engagement with either the upper or lower stretches of the propelling belt for causing the carriage to move either forwardly or backwardly is preferably effected by means of a crank pin or wrist 109 which engages with a longitudinal slot 110 formed in the pawl intermediate of its ends, a horizontal shaft 111 journaled transversely in the side plate 53 of the carriage and having its inner end carrying the crank or wrist 109 and a rocking handle 112 secured to the outer end of the rock shaft 111. When the coupling dog 102 is in its central or neutral position, as shown in Fig. 6, in which it is disengaged from both the upper and lower stretches of the propelling belt the rock arm 112 projects upwardly from this shaft, as shown by dotted lines in Fig. 6. Upon swinging this arm 112 forwardly into a horizontal position, as shown in Fig. 4, the crank pin 109 will lower the coupling dog 102 and engage its lower hook 105 with the lower stretch of the propelling belt so that the carriage is moved forwardly. Upon, however, moving the shifting arm 112 into a position in which the same projects horizontally rearward from the shaft 111, then the dog 112 will be raised from its neutral position into engagement with the upper section 80 of the propelling belt so that the carriage will be moved rearwardly. When drawing the shifting arm 112 forwardly into a horizontal position its movement is limited by means of a stop 113 on the carriage plate 53 at which time the crank 109 is arranged with its axis substantially in vertical alignment with the axis of the shaft 111 whereby the pull of the spring 106 will operate to hold the same in this dead center position. The same effect will be produced upon swinging the shifting arm 112 into a horizontal rearwardly projecting position at which time the movement of this arm in this direction will be limited by means of a stop 114 and a crank pin or wrist 109 will be arranged upon the axis of the shaft 111 and in vertical alignment therewith so that the spring 106 again holds these parts locked on the dead centers between the same.

Means are provided for automatically disengaging the coupling dog from the propelling belt at the end of its forward and backward strokes. This is preferably accomplished by providing the rock shaft 111 on diametrically opposite sides with front tappets 115, 116 which in the normal inoperative position of this shaft project horizontally forwardly and rearwardly, respectively from this shaft and are arranged at right angles to the shifting arm 112. These tappets are also offset laterally from each other in a plane arranged vertically and lengthwise of the machine, as shown in Fig. 5, and the rear tappet 116 is adapted to engage with a stop 117 arranged in the path of this tappet adjacent to the front part of the supporting arm 42 while the front tappet 115 is adapted to engage with a rear tappet 118 arranged in the path of this last mentioned tappet adjacent to the rear part of this supporting arm. If the rock shaft 111 has been turned so that its shifting arm 112 projects forwardly and its rear tappet projects upwardly for engaging the coupling dog with the lower stretch of the propelling belt the carriage will move forwardly until the rear tappet 116 engaged with the front stop 117 and is turned rearwardly by the same, thereby turning the crank or wrist 109 so that it is slightly off center and permitting the centering or righting spring 106 to complete the movement of the coupling dog into its central position and effecting an automatic uncoupling of the carriage from the propelling belt at the end of its forward stroke. A similar action takes place when the rock shaft 111 is turned so that its shifting arm 112 projects horizontally rearward and its front tappet 115 projects upwardly for coupling the carriage with the upper stretch of the propelling belt which moves rearwardly. As the carriage is effecting the last part of its rearward movement the front tappet 115 engages with the rear stop 118 which causes this last mentioned tappet to be moved forwardly, as indicated in Fig. 1, thereby drawing the crank pin or wrist 109 off its dead center relatively to the crank shaft 111 and permitting the spring 106 to again complete the movement of the coupling dog 102 to its central neutral inoperative position.

The front and rear stops 117, 118, are preferably constructed in the form of rods which are adjustable lengthwise of the machine for enabling the point at which the carriage is automatically disconnected from the propelling chain belt to be accurately determined. For this purpose the front stop 117 screws into a lug 119 on the cross head 97 and is held against displacement thereon after adjusting by means of a clamping nut 120 and the rear stop 118 is in like manner screwed into a bracket 121 on the rear part of the supporting arm 42 and held in place after adjusting by means of a clamping screw 122.

In order to hold the upper and lower stretches of the propelling chain belt in position relative to the coupling dog 102 and enable the latter to obtain a good hold on these stretches of the belt an upper and lower pair of retaining lugs 123, 124 are provided on the inner side of the carriage plate 53, the upper pair of lugs 123 receiving between them the upper stretch of the propelling belt adjacent to the upper hook 104 and the lower pair of retaining lugs 124 receiving between them the lower stretch of this belt adjacent to the hook 105, as best shown in Figs. 5, 6 and 7.

When the operator puts a tubular sheet metal blank on the horn the tool supporting carriage is at the rear end of its stroke on the supporting arm. After the operator has interlocked the hooks of the blank and placed them in the proper position over the top of the horn, the handle or shifting arm 112 is pulled forwardly into a horizontal position which causes the carriage to be coupled with the lower stretch of the propelling belt, thereby running the seaming or grooving roll 58 over the interlocked hooks of the blank and effecting a preliminary bend in the same. At the end of the forward stroke the carriage is automatically disengaged from the propelling belt by reason of the rear tappet 116 striking the front stop 117. The operator now swings the shifting lever 112 into a rearwardly projecting position whereby the carriage is coupled with the upper stretch of the propelling belt, thereby causing the latter to move rearwardly and the flattening or finishing roll 70 to be run over the interlocked hooks of the blank and complete the seam between the same. At the end of the rearward stroke of the carriage the front tappet 115 strikes the rear stop 118 thereby disconnecting the carriage from the propelling belt and arresting the movement of the carriage preparatory to effecting its next forward motion.

This mechanism for causing the tool supporting carriage to alternately move in opposite directions and automatically arresting the same at the end of each stroke is very simple in construction, it is also compact and not liable to get out of order, it can be manipulated easily and conveniently and it permits the operation of seaming tubular blanks more rapidly and economically than has been possible heretofore.

In order to keep the two hook-shaped flanges of the blank in their proper interlocked position in advance of the bending or grooving roll 58 and thus ensure proper bending of the same a retaining arm 125 is provided which is secured at its upper end by means of a screw 126 to the outer side of the front part of the carriage plate 53 and provided at its lower end with a finger 127 which is arranged in advance of the roll 58 and close to the upper side of the horn and adapted to engage with the outer hook flange of the tubular blank, as shown in Figs. 1, 4, 5 and 17 and thereby hold the two hook flanges in their fully engaged position preparatory to operating upon them by means of the grooving or bending roll 58. This retaining arm is preferably constructed of spring metal and tends constantly to move laterally outward with its finger 127 at its lower end away from the place where the interengaging hook flanges of the tubular blank are adapted to be arranged on the horn. The inward movement of this arm for adjusting its retaining finger 127 into position for guiding and retaining hook flanges of different widths on tubular blanks and holding them in the proper position is effected by means of an adjusting screw 128 having a connection with the carriage side plate 53 and engaging its head with the outer side of the retaining arm 125. Upon tightening this screw the resilience of the retaining arm is overcome and its finger 127 is moved toward the blank supporting place on top of the horn.

When operating upon sheet blanks which are made of very thin metal, seaming of its longitudinal edges can be effected without using motor power for this purpose. If desired, therefore, the carriage can be moved forwardly and backwardly manually by grasping a handle 129 on the upper front part thereof.

Instead of rotating the driving shaft 88 by means of an electric motor this may be accomplished by means of a belt passing around a driving pulley on any available shaft and a driven pulley 130 secured to the shaft 88, as shown in Fig. 18.

Instead of driving the propelling belt at its rear turn, as shown in Figs. 1 and 18 by means of motor power such driving of this belt may be effected by manual power. An organization capable of being operated manually, is shown in Fig. 19, in which a driving shaft 131 is journaled horizontally and transversely in the upper part of a bracket 132 secured to the front end of the supporting arm 42. This driving shaft is provided with a gear pinion 133 which meshes with a gear wheel 134 on a driven shaft 135 journaled on the central part of the bracket 132 and connected with a driving sprocket wheel 136 around which the front turn of the propelling belt 80 passes. The outer ends of the shafts 131 and 135 are both made square so that the hand crank 137 may be applied to either one of these shafts for operating the propelling belt. When considerable power is required the crank 137 is applied to the shaft 131 so as to secure a reduction in speed, as shown in Fig. 19. When, however, the work is comparatively light the crank 137 may be applied to the shaft 135 and thereby operate in propelling the belt more directly. In this organization of my invention the rear sprocket wheel 138 which supports the rear turn of the propelling belt serves as the tightening wheel for taking out slack in this part and for this purpose the same is mounted on a spindle or pivot pin 139 mounted on a cross head 140 which is adjustably secured to the supporting arm 42 in the same manner in which this is accomplished at the front end of the construction shown in Figs. 1, 10 and 11. For this purpose the rear part of the cross head 140 is provided with an adjusting screw 141 which bears against the rear end of the arm 42 and the cross head is connected with this arm by means of clamping screws 142 which pass through longitudinal slots 143 in the upper and lower parts of the cross head 140, as shown at the right hand end of Fig. 19.

The arm 42 is preferably so constructed that the same is capable of being used for driving the tool supporting carriage by an electric motor, as shown in Fig. 1 or by belt power, as shown in Fig. 18, or by hand power, as shown in Fig. 19.

This machine is also capable of forming seam joints at the corners of sheet metal containers or tubular bodies which are rectangular in cross section. A container of this character is shown in Fig. 22 and comprises two parallel walls 144 which are provided at their opposite ends with inwardly turned or inwardly bent hook flanges 145, and two side walls 146 arranged at right angles to the walls 144 and each provided on its opposite ends with upwardly turned straight flanges 147 each of which is adapted to be interlocked or seamed with one of the hook flanges 145. After the walls of such a tubular body are loosely assembled by engaging the respective straight and hook flanges thereon the same is placed over a horn 148 which has an upper V-shaped surface or saddle the sides of which diverge downwardly from a longitudinal summit 149. This tubular body is placed with its two upper walls over the horn so that the same engage with opposite downwardly diverging sides of the horn 148 and the hook flange 145 and straight flange 147 of the respective joint inclining toward one side of the horn, as shown in Fig. 22.

Means are provided for first tucking in the hook flange 145 close to the straight flange 147. then effecting a preliminary downward bending of this flange from an inclined position into a horizontal position so as to retain the same in engagement with each other and then completing the bending of these flanges into an inclined position below the horizontal position and tightly pressing the same together so as to complete the joint.

This tucking is preferably effected by means of a tucking tool 150 which is preferably constructed in the form of a conical roll which turns about an axis which is arranged at an angle to the horizontal and has its large end arranged next to the horn. This tucking roll is mounted on the front part of the outer side of the carriage plate 53 and during the forward movement of the carriage the upper inner part of this tucking roll engages with the hook flange 145 and tucks or presses the same closely against the straight flange, as shown in Fig. 23 so that these flanges engage firmly with each other. Immediately after the hook flange 145 and straight flange 147 have been tucked together by the tucking tool 150 these two flanges are pressed downwardly from the upwardly inclined position, shown in Fig. 23 to the horizontal position shown in Fig. 24 while the tucking tool is still supporting these flanges. This horizontal bending of these flanges is effected by means of a flattening or bending roll 151 which is mounted on the lower part of the carriage slightly in rear of the tucking roll and provided with a cylindrical face which is adapted to engage with the upper side of the hook flange and merely bend the same downwardly together with the straight flange within the same until they assume the horizontal position. These two operations are performed on this seam during the forward motion of the carriage over the horn upon which the article to be seamed is supported. During the backward or return movement of this carriage the interengaging hook flange and straight flange on the respective corner of the container or tubular body are pressed into a downwardly inclined position and against that side wall of the container adjacent to which the tucking tool is arranged and at the same time these flanges are pressed tightly together so as to complete the seamed joint between the same. This is accomplished by means of a finishing roller 152 which is mounted on the lower rear part of the carriage and provided on its circumference with a V-shaped groove 153 which rides over the corner of the container which at the time is uppermost and presses the inner engaging hook flange 145 and straight flange 147 downwardly into an inclined position against one of the walls of the container, as shown in Fig. 25. The bending roll 151 and the finishing roll 152 are mounted on the lower part of the carriage in the same manner in which the bending roll 58 and finishing or flattening roll 70 are mounted on this carriage as previously described and shown in Figs. 4, 5, 6 and 14 of the drawings and the same description therefore applies to all of these mountings.

The tucking roll 150 is, however, mounted on the carriage so that it is movable laterally into and out of its operative position relatively thereto and thereby permit the tucking roll to clear the space above the horn 148 to permit the container to be seamed to be placed over this horn and thereafter permit of shifting the tucking roller into its operative position so that it will effect a tucking engagement of the hook and straight flanges of the container which are to be seamed together. This function of the tucking roll is preferably accomplished by mounting the same by means of an inclined pivot 154 on the lower arm 155 of a shifting lever, the upper arm 156 of which is engaged by means of an adjusting screw 157 thereon with a rotary cam 158 which is mounted on the adjacent part of the carriage. The shifting levers 155, 156 are mounted by means of a horizontal longitudinal pivot 159 on a bracket 160 secured to the outer side of the carriage plate 53, as shown in Figs. 20 and 21. Upon turning the cam 158 so that its high part engages with the screw 157 then the shifting levers 155, 156 will be turned in the direction for carrying the tucking roller 150 inwardly and upwardly and causing its upper inner edge to press the hook flange 145 inwardly against the straight flange 147 as the carriage moves forwardly and moves the tucking roller 150 along the upper seam of the container. When the cam 158 is turned so as to present the low part of its face to the screw 157 then the levers 155, 156 together with the tucking roll 150 will be turned by gravity into a position in which the upper inner edge of this roll will be carried away from its working position relative to the upper seam of the container.

After one corner of the container, shown in Fig. 22, has been thus seamed the remaining corners are seamed in like manner by mounting the respective corners on the horn 148 in the proper position to effect the tucking, flattening and finishing of the interengaged flanges in the manner previously described.

The cam 158 may be mounted on the carriage in any suitable manner but it is preferably combined with the means which couple and uncouple the carriage with the propelling belt or chain. For this purpose the cam 154 is made of crescent shape and mounted concentrically on the outer end of the rock shaft 111 which carries the shifting arm 112 and front and rear tappets 115, 116, as shown in Figs. 20 and 21. The relative arrangement of this cam 158 and the tappets 115, 116 is such that when the shifting arm 112 is moved into a horizontal forwardly projecting position relatively to the axis of the rock shaft 111 in which it operates to couple the carriage with the lower forwardly moving stretch of the propelling belt through the medium of the coupling dog 102, the cam 158 at the same time engages its high part with the screw 157 of the shifting levers 155, 156 so that the tucking roller at this time is moved into its operative position and will produce a tucking effect upon the interengaged flanges of the container during the respective forward stroke of the carriage.

When, however, the rock shaft 111 is turned into its neutral position at the end of its forward stroke by engagement of the rear tappet 116 with the front stop 117 and disengaging the carriage from the lower stretch of the propelling belt, a low part of the cam 158 will at this time be presented to the screw 157 of the tucker shifting lever and thereby permit the tucking roll to swing away from its operative position next to the uppermost seam of the container. This inoperative position of the tucking roll away from the seam of the container and the ridge on the horn adjacent thereto is maintained upon moving the shifting lever 112 into a position in which it projects horizontally rearward from the axis of the rock shaft 111 at which time the carriage is thereby coupled with the rearwardly moving upper stretch of the propelling belt through the medium of the coupling dog 102 inasmuch as the screw 157 of the tucker shifting lever at this time continues to engage with a low part of the face of the cam 158 in this reverse position of the lever 112. By this means the tucking roller is automatically shifted into its operative position upon manually connecting the carriage with the propelling belt so as to cause a forward movement of the tools over the seam of the container, and the tucking roll is automatically moved into its inoperative position when the movement of the carriage is arrested at the end of its forward stroke and the tucking roll is maintained in its inoperative position during the rearward stroke of the carriage during which it is coupled with the rearwardly moving stretch of the propelling belt. The operation of tucking, partly bending the tucked seam so as to hold the same in place and then completing the bending and seaming operation are thus effected readily, easily and without requiring any special attention on the part of the operator thereby increasing the output of the machine accordingly and enabling goods of this character to be produced at a correspondingly reduced cost.

The horn 148 is so constructed that the same can be attached to and removed from the base 39 in the same manner in which the horn 34 is connected with this base, thereby permitting of interchanging this horn and permitting the same bending mechanism to be used for producing seams on articles which are of various forms in cross section. On account of the various kinds of seaming which this machine is capable of performing a considerable economy can be effected in the equipping of a plant for doing work of this character inasmuch as fewer machines are rquired and a correspondingly reduced amount of floor space is needed.

As a whole this machine is comparatively simple in operation, it has no delicate parts which are liable to get out of order, and it is capable of performing the various operations with ease and facility and with a minimum expenditure of time.

I claim as my invention:—

1. A side seaming machine comprising a supporting arm, a carriage guided on said arm to move lengthwise thereof, a seaming tool mounted on said carriage, a propelling belt mounted on said arm and having oppositely moving stretches, and means for connecting and disconnecting said carriage with either stretch of said propelling belt, comprising a movable dog mounted on the carriage and adapted to engage either of said belt stretches, a crank pivoted on said carriage and engaging said dog, and a centralizing spring connecting said dog with said carriage.

2. A side seaming machine comprising a horn adapted to support the article to be seamed, a supporting arm arranged above the horn and provided with a longitudinal guideway, a carriage slidable lengthwise on said guideway, a tool mounted on said carriage and adapted to work on said article, sprocket wheels mounted on opposite ends of said arm, a propelling sprocket chain belt having its stretches arranged lengthwise of said arm and its turns passing around said sprocket wheels, a coupling dog arranged between the stretches of said belt and pivoted at one end to said carriage for vertically oscillating and provided at its opposite end with upwardly and downwardly projecting hooks adapted to engage the upper and lower stretches of the belt, respectively, and provided intermediate of its ends with a longitudinal slot, and a rock shaft journaled on said carriage and provided with a crank engaging with said dog and with a handle for operating the same.

3. A side seaming machine comprising a horn adapted to support the article to be seamed, a supporting arm arranged above the horn and provided with a longitudinal guideway, a carriage slidable lengthwise on said guideway, a tool mounted on said carriage and adapted to work on said article, sprocket wheels mounted on opposite ends of said arm, a propelling sprocket chain belt having its stretches arranged lengthwise of said arm and its turns passing around said sprocket wheels, a coupling dog arranged between the stretches of said belt and pivoted at one end to said carriage for vertically oscillating and provided at its opposite end with upwardly and downwardly projecting hooks adapted to engage the upper and lower stretches of the belt, respectively, and provided intermediate of its ends with a longitudinal slot, a rock shaft journaled on said carriage and provided with a crank engaging with said dog and with a handle for operating the same, and a spring connecting said dog with the carriage and operating to hold the same yieldingly in its central inoperative position.

4. A side seaming machine comprising a supporting arm, a carriage guided on said arm to move lengthwise thereof, a seaming tool mounted on said carriage, a propelling belt mounted on said arm and having oppositely moving stretches, and means for connecting and disconnecting said carriage with either stretch of said propelling belt, comprising a movable dog mounted on the carriage and adapted to engage either of said belt stretches, means for automatically disengaging said dog from said propelling belt and means for holding said dog out of engagement with both of said belt stretches.

5. A side seaming machine comprising a supporting arm, a carriage guided on said arm to move lengthwise thereof, a seaming tool mounted on said carriage, a propelling belt mounted on said arm and having oppositely moving stretches, and means for connecting and disconnecting said carriage with either stretch of said propelling belt, comprising a movable dog mounted on the carriage and adapted to engage either of said belt stretches, manually operated means for engaging said dog with said propelling belt, automatic means for disengaging said dog from said belt and means for holding said dog out of engagement with both of said belt stretches.

6. A side seaming machine comprising a horn adapted to support the article to be seamed, a supporting arm arranged above the horn and provided with a longitudinal guideway, a carriage slidable lengthwise on said guideway, a tool mounted on said carriage and adapted to work on said article, sprocket wheels mounted on opposite ends of said arm, a propelling sprocket chain belt having its stretches arranged lengthwise of said arm and its turns passing around said sprocket wheels, a coupling dog arranged between the stretches of said belt and pivoted at one end to said carriage for vertically oscillating and provided at its opposite end with upwardly and downwardly projecting hooks adapted to engage the upper and lower stretches of the belt, respectively, and provided intermediate of its ends with a longitudinal slot, a rock shaft journaled on said carriage and provided with a crank engaging with said dog and with a handle for operating the same, tappets projecting from diametrically opposite sides of said rock shaft, and stops arranged at opposite ends of said arm and adapted to be engaged by said tappets, respectively for turning the rock shaft and disengaging said dog automatically from said belt.

7. A side seaming machine comprising a horn adapted to support the article to be seamed, a supporting arm arranged above said horn, a carriage guided on said arm to move lengthwise thereof, a tool mounted on the carriage and adapted to engage the article to be seamed, an endless belt mounted on the arm and having oppositely moving stretches, means for coupling said carriage with one or the other of said stretches at will, a driving wheel around which one stretch of the belt passes, a tightening wheel around which the other turn of the belt passes, and means for adjusting the tightening wheel lengthwise of said arm, comprising a cross head which carries said tightening wheel and which is provided with longitudinal slots, a tightening screw arranged on said cross head and engaging the respective end of said arm, and clamping screws connecting said arm and cross head and passing through said slots in the latter.

8. A side seaming machine comprising a horn adapted to support the article to be seamed, a supporting arm arranged above said horn, a carriage guided on said arm to move lengthwise thereof, a tool mounted on the carriage and adapted to engage the article to be seamed, an endless belt mounted on the arm and having oppositely moving stretches, means for coupling said carriage with one or the other of said stretches at will, an inner gage for said article mounted on the inner part of said horn, and an outer gage for said article movable toward and from the horn and pivotally mounted on said arm.

9. A side seaming machine comprising a horn adapted to support a tubular article, the longitudinal edges of which are provided with co-operating hook flanges, a supporting arm arranged over the horn, a carriage guided on said arm to move lengthwise thereof, a seaming tool mounted on said carriage and adapted to operate on the interlocked hook flanges of said article for seaming the same, and a retaining arm mounted on said carriage and having a finger adapted to engage the outer one of said interlocked hook flanges and hold the same in normal position adjacent to said tool.

10. A side seaming machine comprising a horn adapted to support a tubular article, the longitudinal edges of which are provided with co-operating hook flanges, a supporting arm arranged over the horn, a carriage guided on said arm to move lengthwise thereof, a seaming tool mounted on said carriage and adapted to operate on the interlocked hook flanges of said article for seaming the same, a retaining arm mounted on said carriage and having a finger adapted to engage the outer one of said interlocked hook flanges and hold the same in normal position adjacent to said tool, said arm consisting of resilient material and connected with said carriage, and an adjusting screw connecting said retaining arm with said carriage.

11. A side seaming machine comprising a horn adapted to support a tubular article, the longitudinal edges of which are provided with co-operating hook flanges, a supporting arm arranged over the horn, a carriage guided on said arm to move lengthwise thereof, a seaming roll adapted to engage said interlocked hook flanges and seam them, an adjusting shaft journaled on said carriage and provided with an eccentric, and links mounted on said eccentric and carrying said roll.

12. A side seaming machine comprising a horn adapted to support a tubular article, the longitudinal edges of which are provided with co-operating hook flanges, a supporting arm arranged over the horn, a carriage guided on said arm to move lengthwise thereof, a seaming roll adapted to engage said interlocked hook flanges and seam them, an adjusting shaft journaled on said carriage and provided with an eccentric, links mounted on said eccentric and carrying said roll, an adjusting wheel secured to said shaft and having peripheral notches, and a spring pressed pawl mounted on the carriage and engaging with one or another of said notches.

13. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a tucking tool mounted on the carriage and adapted to engage the inner end of said hook and tuck the same against said flange, and a bending tool arranged on said carriage and adapted to bend the interlocked flange and hook in the direction for seaming the same.

14. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a tucking tool mounted on the carriage and adapted to engage the inner end of said hook and tuck the same against said flange, a bending tool arranged on said carriage and adapted to bend the interlocked flange and hook in the direction for seaming the same, and a finishing tool mounted on said carriage and adapted to engage said interlocked flange and hook and complete bending the same for finishing the seam.

15. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a tucking tool mounted on the carriage and adapted to engage the inner end of said hook and tuck the same against said flange, a bending tool arranged on said carriage and adapted to bend the interlocked flange and hook in the direction for seaming the same, and means for moving said tucking tool into and out of its operative position.

16. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a conical tucking roll mounted on the carriage and adapted to engage its peripheral edge with the inner end of said hook and tuck the same against said flange, and a cylindrical bending roll arranged on said carriage and adapted to bend the interlocked flange and hook partly into their seamed condition.

17. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a conical tucking roll mounted on the carriage and adapted to engage its peripheral edge with the inner end of said hook and tuck the same against said flange, a cylindrical bending roll arranged on said carriage and adapted to bend the interlocked flange and hook partly into their seamed condition, and a finishing roll mounted on said carriage and having a peripheral groove adapted to engage said interlocked and partly bent flange and hook and complete bending the same for finishing the seam.

18. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a conical tucking roll mounted on the carriage and adapted to engage its peripheral edge with the inner end of said hook and tuck the same against said flange, a cylindrical bending roll arranged on said carriage and adapted to bend the interlocked flange and hook partly into their seamed condition, a finishing roll mounted on said carriage and having a peripheral groove adapted to engage said interlocked and partly bent flange and hook and complete bending the same for finishing the seam, a rock lever pivoted on said carriage and having an upper arm and a lower arm carrying said tucking roll, and a rotary cam mounted on said carriage and engaging the upper arm of said rock lever.

19. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a conical tucking roll mounted on the carriage and adapted to engage its peripheral edge with the inner end of said hook and tuck the same against said flange, a cylindrical bending roll arranged on said carriage and adapted to bend the interlocked flange and hook partly into their seamed condition, a finishing roll mounted on said carriage and having a peripheral groove adapted to engage said interlocked and partly bent flange and hook and complete bending the same for finishing the seam, a rock lever pivoted on said carriage and having an upper arm and a lower arm carrying said tucking roll, a rotary cam mounted on said carriage and engaging the upper arm of said rock lever, means for moving said carriage forwardly and backwardly, and means for moving said tucking roll into its operative position while the carriage is moving forwardly and out of its operative position while the carriage is moving backwardly.

20. A side seaming machine comprising a horn having a supporting ridge of angular form in cross section which is adapted to support a rectangular tubular article, one longitudinal edge of which has a laterally projecting flange and the other an inwardly bent hook which receives said flange, a supporting arm arranged over said horn, a carriage guided on said arm for longitudinal movement thereon, a conical tucking roll mounted on the carriage and adapted to engage its peripheral edge with the inner end of said hook and tuck the same against said flange, a cylindrical bending roll arranged on said carriage and adapted to bend the interlocked flange and hook partly into their seamed condition, a finishing roll mounted on said carriage and having a peripheral groove adapted to engage said interlocked and partly bent flange and hook and complete bending the same for finishing the seam, a rock lever pivoted on said carriage and having an upper arm and a lower arm carrying said tucking roll, a rotary cam mounted on said carriage and engaging the upper arm of said rock lever, an endless propelling belt mounted on said arm and having oppositely moving stretches, a dog movably mounted on said carriage and adapted to be engaged at will with either of said belt stretches for moving the carriage either forwardly or backwardly, and a rock shaft journaled on the carriage and having a crank engaging with said dog, a handle on said shaft for manually operating the same and also carrying said cam which operates said rock lever, the relative arrangement of these parts being such that when the rock shaft is turned for coupling the carriage with the forwardly moving propelling belt the cam will throw the tucking roll into its operative position and when the rock shaft is turned for uncoupling the carriage from the forwardly moving stretch of the propelling belt the tucking roll will be permitted to move into its inoperative position.

BROR J. LINDGREN.